US010418657B2

(12) United States Patent
Liu et al.

(10) Patent No.: US 10,418,657 B2
(45) Date of Patent: Sep. 17, 2019

(54) FORMATION OF SOLID OXIDE FUEL CELLS BY SPRAYING

(71) Applicant: PHILLIPS 66 COMPANY, Houston, TX (US)

(72) Inventors: Ying Liu, Bartlesville, OK (US); Mingfei Liu, Bartlesville, OK (US); David M. Bierschenk, Bartlesville, OK (US); Ting He, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 88 days.

(21) Appl. No.: 14/506,743

(22) Filed: Oct. 6, 2014

(65) Prior Publication Data
US 2015/0099209 A1   Apr. 9, 2015

Related U.S. Application Data

(60) Provisional application No. 61/888,239, filed on Oct. 8, 2013.

(51) Int. Cl.
H01M 8/1246 (2016.01)
H01M 8/1253 (2016.01)
H01M 8/126 (2016.01)
H01M 8/1213 (2016.01)
H01M 4/86 (2006.01)
H01M 4/88 (2006.01)
H01M 4/90 (2006.01)
H01M 8/124 (2016.01)

(52) U.S. Cl.
CPC ....... H01M 8/1246 (2013.01); H01M 4/8621 (2013.01); H01M 4/886 (2013.01); H01M 4/9025 (2013.01); H01M 8/126 (2013.01); H01M 8/1213 (2013.01); H01M 8/1253 (2013.01); H01M 2008/1293 (2013.01); H01M 2300/0074 (2013.01); H01M 2300/0077 (2013.01); Y02E 60/525 (2013.01); Y02P 70/56 (2015.11)

(58) Field of Classification Search
CPC ............. H01M 8/1213; H01M 8/1246; H01M 8/1253; H01M 8/126; H01M 4/8621; H01M 4/886; H01M 4/9025
USPC .......................... 429/482, 535; 427/115, 565
See application file for complete search history.

(56) References Cited

U.S. PATENT DOCUMENTS

| 3,533,833 | A | 10/1970 | Takahashi et al. |
|---|---|---|---|
| 3,823,302 | A | 7/1974 | Muehlberger |
| 3,839,618 | A | 10/1974 | Muehlberger |
| 4,049,841 | A | 9/1977 | Coker et al. |
| 4,264,641 | A | 4/1981 | Mahoney et al. |
| 4,436,794 | A | 3/1984 | Takeuchi et al. |
| 4,591,538 | A | 5/1986 | Kunz |
| 4,609,562 | A | 9/1986 | Isenberg et al. |
| 4,971,830 | A | 11/1990 | Jensen |
| 5,035,962 | A | 7/1991 | Jensen |
| 5,085,742 | A | 2/1992 | Dollard et al. |
| 5,230,849 | A * | 7/1993 | Hsu ........................ C25B 9/08 264/104 |
| 5,234,722 | A | 8/1993 | Ito et al. |
| 5,356,728 | A | 10/1994 | Balachandran et al. |
| 5,387,482 | A | 2/1995 | Anani |
| 5,426,003 | A | 6/1995 | Spengler et al. |
| 5,516,597 | A | 5/1996 | Singh et al. |
| 5,527,633 | A | 6/1996 | Kawasaki et al. |
| 5,549,983 | A | 8/1996 | Yamanis |
| 5,716,422 | A | 2/1998 | Muffoletto et al. |
| 5,908,713 | A | 6/1999 | Ruka et al. |
| 6,139,637 | A | 10/2000 | Takahashi et al. |
| 6,248,468 | B1 | 6/2001 | Ruka et al. |
| 6,358,567 | B2 * | 3/2002 | Pham ..................... C23C 24/08 427/115 |
| 6,558,831 | B1 | 6/2003 | Doshi et al. |
| 7,014,942 | B2 | 2/2006 | Gorte et al. |
| 7,045,237 | B2 | 6/2006 | Sridhar et al. |
| 7,067,215 | B2 | 6/2006 | Lazaroff et al. |
| 7,445,814 | B2 | 11/2008 | Mardilovich et al. |
| 7,476,461 | B2 | 1/2009 | Finnerty |
| 7,485,385 | B2 | 2/2009 | Seccombe, Jr. et al. |
| 7,527,761 | B2 | 5/2009 | Swartzlander et al. |
| 7,553,568 | B2 | 6/2009 | Keefer |
| 7,592,090 | B2 | 9/2009 | Seabaugh et al. |

(Continued)

FOREIGN PATENT DOCUMENTS

EP 0439938 8/1991
EP 1930974 6/2008

(Continued)

OTHER PUBLICATIONS

Sulistyo et al., Manufacturing of Electrolyte and Cathode Layers SOFC Using Atmospheric Spraying Method and Its Characterization, Jan. 2013, International Journal of Science and Engineering, 4, 30-33 (Year: 2013).*
Dong Ding, Beibei Liu, Zina Zhu, Shuai Zhou, and Changrong Xia, "High Reactive Ce0.8Sm0.2︎1.9 Powders Via a Carbonate Co-Precipitation Method as Electrolytes for Low Temperature Solid Oxide Fuel Cells," 2008, pp. 896-899.
M. Stanley Whittingham, "Electrical Properties of Ceria-Based Oxides and their Application to Solid Oxide Fuel Cells", vol. 52, No. 1-3, 1992, pp. 162-172.
Daisuke Hirabayashi, Atsuko Tomita, Takashi Hibino, Masahiro Nagao and Mitsuru Sano, 2004, "Design of a Reduction-Resistant Ce0.8SM0.2O1.9 Electrolyte Through Growth of a Thin BaCe1-xSMxO3-Layer Over Electrolyte Surface", 2004, vol. 7, No. 10, pp. A318-A320.

(Continued)

Primary Examiner — Sean P Cullen
(74) Attorney, Agent, or Firm — Phillips 66 Company

(57) ABSTRACT

The present embodiment describes a method of forming different layers in a solid oxide fuel cell. The method begins by preparing slurries which are then delivered to a spray nozzle. The slurries are then atomized and sprayed subsequently onto a support to produce a layer which is then dried. In this embodiment different layers can comprise an anode, an electrolyte and a cathode. Also the support can be a metal or a metal oxide which is later removed.

7 Claims, No Drawings

(56) References Cited

U.S. PATENT DOCUMENTS

| | | | |
|---|---|---|---|
| 7,595,127 | B2 | 9/2009 | Seabaugh et al. |
| 7,604,892 | B2 | 10/2009 | Yoo et al. |
| 7,618,731 | B2 | 11/2009 | Kumar et al. |
| 7,651,810 | B2 | 1/2010 | Wei et al. |
| 7,691,521 | B2 | 4/2010 | Ahmed et al. |
| 7,749,626 | B2 | 7/2010 | Take |
| 2003/0162082 | A1 | 8/2003 | Allen et al. |
| 2004/0018409 | A1 | 1/2004 | Hui et al. |
| 2005/0214599 | A1 | 9/2005 | Sakai et al. |
| 2006/0134491 | A1 | 6/2006 | Hilchenko et al. |
| 2006/0141137 | A1 | 6/2006 | Anderson et al. |
| 2006/0204809 | A1 | 9/2006 | Horiuchi et al. |
| 2006/0263655 | A1 | 11/2006 | Schaevitz et al. |
| 2007/0042112 | A1* | 2/2007 | Vassen ............... C23C 4/02 427/115 |
| 2007/0072035 | A1* | 3/2007 | Korevaar ......... H01M 4/8621 429/454 |
| 2007/0180689 | A1 | 8/2007 | Day et al. |
| 2008/0029026 | A1 | 2/2008 | Selman et al. |
| 2008/0131748 | A1 | 6/2008 | Katagiri et al. |
| 2009/0202881 | A1 | 8/2009 | Uchiyama |
| 2010/0062312 | A1 | 3/2010 | Larsen et al. |
| 2010/0112408 | A1 | 5/2010 | Yang et al. |
| 2010/0123370 | A1 | 5/2010 | Yamaguchi et al. |
| 2010/0209816 | A1* | 8/2010 | Kwak ................. B22F 1/02 429/488 |
| 2010/0227120 | A1* | 9/2010 | Haile ............... H01M 8/1016 428/141 |
| 2011/0195342 | A1 | 8/2011 | Luo et al. |
| 2011/0210281 | A1 | 9/2011 | Kaigawa et al. |
| 2011/0305973 | A1 | 12/2011 | Kobayashi et al. |
| 2012/0043010 | A1 | 2/2012 | Batawi et al. |
| 2013/0052562 | A1 | 2/2013 | Yoon |
| 2013/0074317 | A1 | 3/2013 | Weber et al. |
| 2013/0143142 | A1 | 6/2013 | Liu et al. |
| 2013/0196247 | A1* | 8/2013 | Liu ................. H01M 10/0562 429/482 |
| 2013/0209904 | A1 | 8/2013 | Liu et al. |
| 2013/0224627 | A1 | 8/2013 | Liu et al. |

FOREIGN PATENT DOCUMENTS

| | | |
|---|---|---|
| EP | 2031677 | 3/2009 |
| EP | 2031684 | 3/2009 |
| WO | 2003036746 | 5/2003 |
| WO | 2011100361 | 8/2011 |
| WO | 2012018297 | 2/2012 |
| WO | 2012054420 | 4/2012 |
| WO | 2013060669 | 5/2013 |

OTHER PUBLICATIONS

Daisuke Hirabayashi, Atsuko Tomita, Shinya Teranishi, Takashi Hibino and Mitsuru Sano, Improvement of a Reduction-Resistant $Ce0.8Sm0.2O1.9$ Electrolyte by Optimizing a Thin $BaCe1-_xSm_xO3-_x$ Layer for Intermediate-Temperature SOFCS, vol. 176, 2005, pp. 881-887.

Science, Yun-Hui Huang, Ronald I. Dass, Zheng-Liang Xing, John B. Goodenough, "Double Perovskites as Anode Materials for Solid-Oxide Fuel Cells", Apr. 14, 2006, 5 pages.

T. Inoue, T. Setoguchi, K. Eguchi and H. Arai, "Study of a Solid Oxide Fuel Cell with A Ceria-Based Solid Electrolyte" vol. 35, 1989, pp. 285-291.

S.P. Jiang & W. Wang, "Novel Structured Mixed Ionic and Electronic Conducting Cathodes of Solid Oxide Fuel Cells," 2005, vol. 176, pp. 1351-1357.

Mingfei Liu, Dong Ding, Yaohui Bai, Ting He and Melin Liu, "An Efficient SOFC Based on Samaria-Doped Ceria (SDC) Electrolyte", 2012, vol. 159, No. 6, pp. B661-B665.

Mingfei Liu, Jianfeng Gao, Dehua Dong, Xingqin Liu and Guangyao Meng, "Comparative Study on the Performance of Tubular and Button Cells with YSZ Membrane Fabricated by a Refined Particle Suspension Coating Technique," International Journal of Hydrogen Energy 35, 2010, pp. 10489-10494.

Mingfei Liu, Ranran Peng, Dehua Dong, Jianfeng Gao, Xingqin Liu, and Guangyao Meng, "Direct Liquid Methanol-Fueled Solid Oxide Fuel Cell," Journal of Power Sources, 185, 2008, pp. 188-192.

Mingfei Liu YongMan Cho, Lei Yang, Kevin Blinn, Wentao Qin, Ping Liu and Meilin Liu, "Direct Octane Fuel Cells: A Promising Power for Transportation," Nano Energy 2012 1, pp. 448-455.

Mingfei Liu, Dehua Dong, Fei Zhao, Jianfeng Gao, Dong Ding, Xingqin Liu and Guangyao Meng, "High-Performance Cathode -Supported SOFCS Prepared by a Single-Step Co-Firing Process," Journal of Power Sources 182, 2008, pp. 585-588.

Melin Liu, Matthew E. Lynch, Kevin Blinn, Faisal M. Alamgir and YongManChoi, "Rational SOFC Material Design: New Advances and Tools," Nov. 2011, No. 11, vol. 14, pp. 534-546.

Mingfei Liu, Dehua Dong, Ranran Peng, Jianfeng Gao, Juan Diwu, Xingquin Liu and Guangyao Meng, YSZ-Based SOFC with Modified Electrode/Electrolyte Interfaces for Operating at Temperature Lower Than 650° C., Journal of Power Sources 180, 2008, pp. 215-220.

Zongping Shao & Sossina M. Haile, "A High Performance Cathode for the Next Generation of Solid-Oxide Fuel Cells," Nature, vol. 431, 2004, pp. 170-173.

A. Tsoga, A. Naoumidis, D. Stover, Total Electrical Conductivity and Defect Structure of $ZrO2$—$CeO2$—$Y2O3$—$Gc2O3$ Solid Solutions, vol. 135, 2000, pp. 403-409.

Lei Yang, Shizhong Wang, Kevin Blinn, Mingfei Liu, Ze Liu, Zhe Cheng, Meilin Liu, Enhanced Sulfur and Coking Tolerance of a Mixed Ion Conductor for SOFCs: $BaZr0.Ce0.7Y0.2-xYbx03-\delta$, Science, 2009, Vole 326, pp. 126-129.

Lei Yang, YongMan Choi, Wentao Qin, Haiyan Chen, Kevin Blinn, Mingfei Liu, Ping Liu, Jianming Bai, Trevor A Tyson & Melin Liu, "Promotion of Water-Mediated Carbon Removal by Nanostructured Barium Oxide/Nickel Interfaces in Solid Oxide Fuel Cells," Nature Communications, 2011, pp. 1-9.

Zhongliang Zhan and Scott A. Barnett, "An Octane-Fueled Solid Oxide Fuel Cell," Science, 2005, vol. 308, pp. 844-847.

Xinge Zhang, Mark Robertson, Cyrille Deces-Petit, Yongsong Xie, Rob Hui, Wei Qu, Olivera Kesler, Radenka Maric and Dave Ghosh, "Solid Oxide Fuel Cells with Bi-Layered Electrolyte Structure", ScienceDirect, 2008, pp. 800-805.

Ling Zhao, Beibei He, Junchong Shen, Fanglin Chen and Changrong Xia, "$BaZr0.1Ce0.7Y0.2O3-\delta$ as an Electronic Blocking Material for Microtubular Solid Oxide Fuel Cells Based on Doped Ceria Electrolyte," Electrochemistry Communications 13, 2011, pp. 450-453.

Chendong Zuo, Shaowu Zha, Meilin Liu, Masaharu Hatano and Makoto Uchiyama, "$Ba(Zr01C20.7Y0.2)O3-\delta$ As An Electrolyte for Low-Temperature Solid-Oxide Fuel Cells," Adv. Mater. 2006, vol. 18, pp. 3318-3320.

Renewable Energy Focus, News, "New Ceramic Material May Expand Uses for Solid Oxide Fuel Cells," 2 pages.

Xue Li, Nansheng Xu, Lingling Zhang and Kevin Huang, "Combining Proton Conductor $BaZr0.8Y0.2O3-\delta$ With Carbonate: Promoted Densification and Enhanced Proton Conductivity," Electrochemistry Communications 13, 2011, pp. 694-697.

Kazumi Tanimoto, Yoshinori Miyazaki, Masahiro Yangagida, Shigeo Tansae, Toshikatsu Kojima, Norikazu Ohtori, Hironobu Okuyama and Teruo Kodama, "Cell Performance of Molten-Carbonate Fuel Cell with Alkali and Alkaline-Earth Carbonate Mixtures," Journal of Power Sources, 39, 1992, pp. 285-297.

Carina Lagergren, Goran Lindbergh, "Experimental Determination of Effective Conductivities in Porous Molten Carbonate Fuel Cell Electrodes," Electrochimca Act 44, 1998, pp. 503-511.

Changcheng Chen, Mingfei Liu, Yaohui Bai, Lei Yang, Erqing Xie and Meilin Liu, Anode-Supported Tubular SOFCs Based on $BaZr0.1Ce0.7Y0.1Yb0.1O3-\delta$ Electrolyte, Electrochemistry Communications, 13, 2011, pp. 615-618.

PCT Invitation to Pay Additional Fees and, Where Applicable, Protest Fee, 6 pages.

(56) References Cited

OTHER PUBLICATIONS

PCT Notification of Transmittal of the International Search Report and the Written Opinion of the International Searching Authority, or the Declaration, International Application No. PCT/US2014/013729, International Filing Date Jan. 30, 2014, 19 pages.
PCT Notification of Transmittal of the International Search Report and the Written Opinion of the International Searching Authority, International Application No. PCT/US2012/052690, International Filing Date Aug. 28, 2012, 23 pages.
PCT Notification of Transmittal of the International Search Report and the Written Opinion of the International Searching Authority, or the Declaration, International Application No. PCT/US2012/054609, International Filing Date Sep. 11, 2012, 12 pages.
PCT Notification of Transmittal of the International Search Report and the Written Opinion of the International searching Authority, or the Declaration, International Application No. PCT/US2013/041172, International Filing May 15, 2013, 10 pages.
PCT Notification of Transmittal of the International Search Report and the Written Opinion of the International Searching Authority, or the Declaration, International Application No. PCT/US2014/059069, International Filing Date Oct. 3, 2014, 16 pages.
Amendment and Response to Office Action dated Jun. 19, 2014, U.S. Appl. No. 13/596,787, Filing Date: Aug. 28, 2012, 11 pages.
PCT Notification of Transmittal of the International Search Report and the Written Opinion of the International Searching Authority, or the Declaration, International Application No. PCT/US2014/059231; International Filing Date: Oct. 6, 2014; 10 pages.

* cited by examiner

FORMATION OF SOLID OXIDE FUEL CELLS BY SPRAYING

CROSS-REFERENCE TO RELATED APPLICATIONS

This application is a non-provisional application which claims the benefit of and priority to U.S. Provisional Application Ser. No. 61/888,239 filed Oct. 8, 2013, entitled "Formation of Solid Oxide Fuel Cells By Spraying," which is hereby incorporated by reference in its entirety.

STATEMENT REGARDING FEDERALLY SPONSORED RESEARCH OR DEVELOPMENT

None.

FIELD OF THE INVENTION

A method of multilayer formation of solid oxide fuel cells.

BACKGROUND OF THE INVENTION

The world relies heavily on energy produced from fossil fuels, but as a non-renewable energy source (at least in our lifetimes), fossil fuels have serious limitations. The ever-increasing demand and dwindling supply of fossil fuels will inevitably cause significant problems in the future. In remote areas of developing countries, transmission and distribution of fossil fuel-generated energy can be difficult and expensive. Additionally, the burning of fossil fuels results in the formation of smog and global warming, and further contributes to our environmental problems. Thus, developing a clean alternative energy industry is key to improving the quality of life for individuals and communities, and to ameliorate global warming and other environmental problems.

The critical technical barrier to the widespread application of various alternative energy technologies is performance limitations of the key materials. For example, in solar-fuel production, the efficiency is relatively low since the current photocathode materials show sluggish $H_2$ evolution reaction kinetics and the photoanode materials have insufficient light absorption and carrier collection capabilities. In wind power, the lifetime of turbine blades currently made of polymer-matrix composite materials reinforced with fiberglass or graphite fibers can be further enhanced when a new material with adequate stiffness to prevent failure as well as sufficient long term fatigue in harsh conditions is developed. Therefore, materials science and technology plays a pivotal role in building the world's energy future, from fundamental discovery science, to improving energy production processes. The discovery and optimization of new materials could effectively advance solutions to our energy challenges.

The demand for clean, secure, and renewable energy has stimulated great interest in fuel cells. Fuel cells are one distinct category of devices that are capable of converting chemical energy into electrical energy. Among the fuel cells that are currently under active development, alkaline, polymeric-electrolyte-membrane and phosphoric-acid fuel cells all require essentially pure hydrogen as the fuel to be fed to the anode.

Solid Oxide Fuel Cells ("SOFCs"), on the other hand, are a type of fuel cells that use a solid oxide or ceramic as the electrolyte of a cell. The basic solid oxide fuel cell is generally made up of three layers. A single cell consisting of these three layers stacked together is typically only a few millimeters thick. Hundreds of these cells are then connected in series to form what most people refer to as an "SOFC stack". The ceramics used in SOFCs do not become electrically and ionically active until they reach very high temperature and as a consequence the stacks have to run at temperatures ranging from 500 to 1,000° C. Reduction of oxygen into oxygen ions occurs at the cathode. These ions can then diffuse through the solid oxide electrolyte to the anode where they can electrochemically oxidize the fuel. In this reaction, a water byproduct is given off as well as two electrons. These electrons then flow through an external circuit where they can do work. The cycle then repeats as those electrons enter the cathode material again.

SOFCs offer great promise for the most efficient and cost-effective utilization of a wide variety of fuels such as hydrocarbons, coal gas and gasified biomass. Because of the relatively high operating temperature (500-1000° C.), the fuel processing reaction can be carried out within the cell stacks without additional fuel processors. Another advantage of SOFCs is the fuel flexibility. A wide variety of practical hydrocarbons such as methane, propane, gasoline, diesel and kerosene can be directly utilized as the fuels in SOFCs. The direct utilization of hydrocarbon fuels will increase the operating efficiency and reduce system costs, which will accelerate substantially the use of SOFCs in transportation, residential and distributed-power application. Among the hydrocarbon fuels, natural gas such as methane is regarded as relatively cheap and popularly available fuel with plenty of deposits. Additionally, SOFCs that can directly run on natural gas would highly reduce the operating cost and accelerate the commercialization of SOFC system.

The basic chemical reactions at the anode side of an SOFC is the oxidation of fuels, such as hydrogen gas and/or carbon monoxide, to generate electrons:

Anode: $H_2 + O^{2-} \rightarrow H_2O + 2e^-$ and/or $CO + O^{2-} \rightarrow CO_2 + 2e^-$ The reaction at the cathode side is the reduction of oxygen to oxygen ions:

Cathode: $O_2 + 4e^- \rightarrow 2O^{2-}$

Therefore, the overall reaction of an SOFC becomes:

Overall: $H_2 + \frac{1}{2}O_2 \rightarrow H_2O$

Or $H_2 + CO + O_2 \rightarrow H_2O + CO_2$

Therefore, SOFCs typically run on pure hydrogen or mixture of hydrogen and carbon monoxide by internally or externally reforming a hydrocarbon fuel, while air serves as the oxidant. As shown above, if pure hydrogen is used, then the product is pure water, whereas carbon dioxide is produced if carbon monoxide is also used.

In an effort to reduce fuel electrode manufacturing costs, sintering processes have been attempted, such as those described in U.S. Pat. Nos. 4,971,830, 5,035,962, 5,908,713 and 6,248,468. However, fuel electrodes applied by a sintering process are relatively time consuming in that it still requires at least two processing steps, an initial application followed by high temperature sintering. Moreover, sintered fuel electrodes may experience marginal physical stability over time.

Other attempts to reduce fuel electrode fabrication costs include plasma spraying (e.g. atmospheric plasma spraying "APS", vacuum plasma spraying "VPS", plasma arc spraying, flame spraying) which generally involves spraying a molten powdered metal or metal oxide onto an underlying substrate surface using a plasma thermal spray gun to form a deposited layer having a microstructure generally characterized by accumulated molten particle splats. Plasma spraying techniques are described in U.S. Pat. Nos. 3,220,068, 3,839,618, 4,049,841, and 3,823,302 and 4,609,562 generally teach plasma spray guns and use thereof, each of which are herein incorporated by reference in their entirety. Although plasma spraying has been used for fabrication of certain fuel cell layers, such as those described in U.S. Pat. Nos. 5,085,742, 5,234,722 5,527,633 (plasma sprayed electrolyte) U.S. Pat. No. 5,426,003 (plasma sprayed interconnect), U.S. Pat. No. 5,516,597 (plasma sprayed interlayer) and U.S. Pat. No. 5,716,422 (plasma sprayed air electrode), use of such plasma spraying techniques have been of limited value when used to apply a fuel electrode onto an electrolyte because they tend to result in a fuel electrode that poorly adheres to the electrolyte and exhibits poor thermal cyclability due to the mismatch of thermal coefficients of expansion between the metal portion of the fuel electrode and the ceramic electrolyte. Moreover, these conventional plasma spraying techniques tends to result in a fuel electrode that has a low porosity after continued use, thereby causing voltage loss when current flows as a result of polarization due to a low rate of diffusion of fuel gases into and reaction product out from the interface between the fuel electrode and electrolyte.

There is thus a need for a SOFC and a method for making the SOFC that can generally achieve above-described favorable technical properties and can be manufactured at a low cost.

BRIEF SUMMARY OF THE DISCLOSURE

The present embodiment describes a method of forming different layers in a solid oxide fuel cell. The method begins by preparing slurries which are then delivered to a spray nozzle. The slurries are then atomized and sprayed subsequently onto a support to produce a layer which is then dried. In this embodiment different layers can comprise an anode, an electrolyte and a cathode. Also the support can be a metal or a metal oxide which is later removed.

BRIEF DESCRIPTION OF THE DRAWINGS

A more complete understanding of the present invention and benefits thereof may be acquired by referring to the follow description taken in conjunction with the accompanying drawings in which:
None.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The present embodiment describes a method of forming different layers in a solid oxide fuel cell. The method begins by preparing slurries which are then delivered to a spray nozzle. The slurries are then atomized and sprayed subsequently onto a support to produce a layer which is then dried. In this embodiment different layers can comprise an anode, an electrolyte and a cathode. Also the support can be a metal or a metal oxide which is later removed. In one embodiment of the SOFC the anode is typically porous to allow the fuel to flow towards the electrolyte. Anodes are typically chosen for their (1) high electrical conductivity; (2) a thermal expansion that matches those of the adjoining components; (3) the capacity to avoid coke deposition; (4) fine particle size; (5) chemical compatibility with another cell components (electrolyte and interconnector) under a reducing atmosphere at the operating temperature; (6) large triple phase boundary; (7) high electrochemical or catalytic activity for the oxidation of the selected fuel; (8) high porosity (20-40%) adequate for the fuel supply and the reaction product removal; and (9) good electronic and ionic conductive phases. In the current SOFC any known anode electrodes can be utilized. Types of anodes that can be used include Ni/YSZ, Cu/Ni, perovskite structures with a general formula of ABO3. In the perovskite structure the A cations can be group 2, 3, or 10 elements or more specifically cations such as, La, Sr, Ca or Pb. Also in the perovskite structure the B cations can be group 4, 6, 8, 9, or 10 elements or more specifically cations such as Ti, Cr, Ni, Fe, Co or Zr. Other materials that the anode could be include nickel oxide, nickel, yttria stabilized zirconia, scandia stabilized zirconia, gadolinium doped ceria, samarium doped ceria, doped barium zirconate cerate, or combinations thereof.

In one embodiment the anode can be pre-reduced at a temperature from about 400° C. to about 800° C. in a reducing atmosphere containing 1-100% hydrogen or other reducing gas atmospheres.

In one embodiment of the SOFC the cathode is typically porous to allow the oxygen reduction to occur. Any cathode material known to those skilled in the art can be used. One example of cathode materials that are typically used include perovskite-type oxides with a general formula of $ABO_3$. In this embodiment the A cations can be lower valance cations such as La, Sr, Ca or Pb. The B cations can be metals such as Ti, Cr, Ni, Fe, Co or Zr. Examples of these perovskite-type oxides include $LaMnO_3$. In one differing embodiment the perovskite can be doped with a group 2 element such as $Sr^{2+}$ or $Ca^{2+}$. In another embodiment cathodes such as $Pr_{0.5}Sr_{0.5}FeO_3$; $Sr_{0.9}Ce_{0.1}Fe_{0.8}Ni_{0.2}O_3$; $Sr_{0.8}Ce_{0.1}Fe_{0.7}Co_{0.3}O_3$; $LaNi_{0.6}Fe_{0.4}O_3$; $Pr_{0.8}Sr_{0.2}Co_{0.2}Fe_{0.8}O_3$; $Pr_{0.7}Sr_{0.3}Co_{0.2}Mn_{0.8}O_3$; $Pr_{0.8}Sr_{0.2}FeO_3$; $Pr_{0.6}Sr_{0.4}Co_{0.8}Fe_{0.2}O_3$; $Pr_{0.4}Sr_{0.6}Co_{0.8}Fe_{0.2}O_3$; $Pr_{0.7}Sr_{0.3}Co_{0.9}Cu_{0.1}O_3$; $Ba_{0.5}Sr_{0.5}Co_{0.8}Fe_{0.2}O_3$; $Sm_{0.5}Sr_{0.5}Co_3$; or $LaNi_{0.6}Fe_{0.4}O_3$ can be utilized. Other materials that the cathode could be include lanthanum strontium iron cobalt oxide, doped ceria, strontium samarium cobalt oxide, lanthanum strontium iron oxide, lanthanum strontium cobalt oxide, barium strontium cobalt iron oxide, or combinations thereof.

The electrolyte used in the SOFC is responsible for conducting ions between the electrodes, for the separation of the reacting gases, for the internal electronic conduction blocking, and for forcing the electrons to flow through the external circuit. Some of the typical characteristics that electrolytes typically invoke include (1) an oxide-ion conductivity greater than $10^{-2}$ S·cm$^{-1}$ at the operating temperature; (2) negligible electronic conduction, which means an electronic transport number close to zero; (3) high density to promote gas impermeability; (4) thermodynamic stability over a wide range of temperature and oxygen partial pressure; (5) thermal expansion compatible with that of the electrodes and other cell materials from ambient temperature to cell operating temperature; (6) suitable mechanical properties, with fracture resistance greater than 400 MPa at room temperature; (7) negligible chemical interaction with electrode materials under operation and fabrication conditions to avoid formation of blocking interface phases; (8) ability to be elaborated as thin layers (less than 30 µm) and (9) low cost of starting materials and fabrication.

In the current SOFC the electrolyte can be any electrolyte known to those skilled in the art. In one embodiment the electrolyte is a dense stabilized zirconia or a doped ceria. In one embodiment the electrolyte comprises a porous BZCYYb as the backbone and carbonate as the secondary phase within the pores of.

The weight ratio of BZCYYb in the composite electrolyte may vary, as long as the composite electrolyte can reach higher conductivity as well as current density as compared to non-composite electrolyte. In one embodiment, the weight ratio of BZCYYb in the composite electrolyte ranges from 9:1 to 1:1, but more preferably ranges from 50-90% or 70-80%. In another embodiment, the weight ratio of BZCYYb is about 75%.

The weight percentage of carbonate in the composite electrolyte also may vary, as long as the composite electrolyte can maintain physical integrity during operation. In one embodiment, the weight percentage of carbonate in the composite electrolyte ranges from 10 to 50 wt %. In another embodiment, the weight percentage of carbonate in the composite electrolyte ranges from 20 to 30 wt %, in yet another embodiment, the carbonate is about 25%.

In one example of preparing BZCYYb lithium-potassium carbonate is typically made first. Stoichiometrical amount of $Li_2CO_3$ and $K_2CO_3$ were mixed in the weight proportion of 45.8:52.5 and milled in a vibratory mill for 1 hour. The mixture was then heated to 600° C. for 2 hours. The heated mixture was then quenched in air to the room temperature and ground. The resulting lithium-potassium carbonate was used later in the preparation of composite electrolyte with BZCYYb.

In one embodiment the BZCYYb powder was prepared by solid-state reaction, but other methods could also be used. Stoichiometric amounts of high-purity barium carbonate, zirconium oxide, cerium oxide, ytterbium oxide and yttrium oxide powders (all from Sigma-Aldrich® Chemicals) were mixed by ball milling in ethanol (or other easily evaporated solvent) for 24 h, followed by drying at 80° C. for overnight and calcinations at 1100° C. in air for 10 h. The calcinated powder was ball milled again, followed by another calcination at 1100° C. in air for 10 h to produce single phase BZCYYb.

The resulted BZCYYb powder and the carbonate obtained above were mixed at weight ratio of 75:25 and thoroughly ground again for one hour. The mixture was then heated to 680° C. for 60 minutes until only the carbonate melted and wet the BZCYYb grain boundaries in the mixture. Next, it was quenched (i.e. fast cooling) in air to room temperature. The quenched mixture was ground again to get the composite electrolyte powder.

In another example an alternate way of preparing BZCYYb powder can be described. In this embodiment stoichiometric amounts of high-purity barium carbonate, zirconium oxide, cerium oxide, ytterbium oxide, and yttrium oxide powders (all from Sigma-Aldrich® Chemicals) were mixed by ball milling in ethanol for 48 h, followed by drying in an oven and calcination at 1100° C. in air for 10 h. The calcined powder was ball milled again, followed by another calcination at 1100° C. in air for 10 h.

The $CeO_2$ and $ZrO_2$ powders with different particle sizes were used to optimize the fabrication procedures. To prepare electrolyte samples for the conductivity measurement, we pressed the calcined powders isostatically into a disk at 274.6 MPa. The green disks had a diameter of 10 mm, with a typical thickness of 1 mm. The disks were then sintered at 1500° C. for 5 h in air (relative density >96%).

In some embodiments a Sc-doped BZCY powder can be prepared. In one example of this embodiment BZCY-Sc with a nominal composition of $BaCe_{0.7}Zr_{0.1}Y_{0.1}Sc_{0.1}O_{3-\delta}$ (BZCY-Sc) was synthesized by a conventional solid state reaction (SSR) method. Stoichiometric amount of high-purity barium carbonate, zirconium oxide, cerium oxide, yttrium oxide and scandium oxide powders ($BaCO_3$:$ZrO2$:$CeO_2$:$Y_2O_3$:$Sc_2O_3$=167.33:12.32:120.48:22.58:13.79, all from Sigma-Aldrich® Chemicals) were mixed by ball milling in ethanol for 24 hours, followed by drying at 80° C. for overnight and calcinations at 1100° C. in air for 10 hours. The calcined powder was ball milled again, followed by another calcination at 1100° C. in air for 10 hours to produce single phase BZCY-Sc.

In the present method, the calcining step is carried out at preferably higher than 1000° C. in air for 10 hours. However, the temperature and the length of calcination can vary, depending on different factors to be considered, such as the particle size chosen. The particle size of the zirconium oxide powder is preferably between 50 nm and 200 nm, and more preferably between 50 nm and 100 nm. The particle size of the cerium oxide powder is preferably between 1 µm and 20 µm, and more preferably between 5 and 10 µm.

In one embodiment the method only sprays one anode layer, one electrode layer and one cathode layer. In another embodiment the method only sprays two anode layers, two electrolyte layers and two cathode layers.

The different layers of the process can by sprayed by preparing a ceramic slurry following by delivering the slurry to a spray nozzle. The slurry is then sprayed and atomized onto a support to form a sprayed layer which is dried. The flow rate of the spraying can range from about 0.1 ml/min to about 20 ml/min. The pressure of the spraying can range from about from about 0.5 psi to about 100 psi. The atomization of the spray can either be ultrasonic or pneumatic.

The layers or each successive layer added by the spraying can be identical to the one before it or different. In a more specific example the material used for the anode support could be different or identical to the material used of the anode functional layer. In one embodiment the thickness of each layer deposited by single spraying pass ranges can range from about 50 nm to about 1 µm. In one embodiment each layer sprayed by this method is repeated at least two times. In another embodiment each layer sprayed by this method is repeated at least three times. In one embodiment, the spraying of layers is repeated till the cumulative thickness of the layers on top of the tape casted anode is at least 1 µm. In another embodiment the thickness of the deposited layers has a variance of less than one sigma.

In one embodiment a heat treatment can be applied after the spraying of the different layers of the anode support. The temperature of the heat treatment can range between 850° C. to about 1500° C.

As described above the current embodiments describe a method of forming a solid oxide fuel cell. The method begins by preparing an anode which is then delivered to a spray nozzle and applied to the support. From there the sprayed anode is dried. The electrolyte is then sprayed and atomized onto the anode to produce a sprayed electrolyte. From there the sprayed electrolyte is dried. From there the cathode is sprayed onto the dried electrolyte and is allowed to dry. A heat-treatment can be applied after spraying each layer in temperature ranges from about 850° C. to about 1500° C.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method of forming different layers m in a solid oxide fuel cell comprising:
   preparing a slurry;
   delivering the slurry to a spray nozzle;
   atomizing and spraying the slurry onto a support to produce a sprayed layer;
   and drying the sprayed layer;
   wherein the different layers comprise an anode, an electrolyte and a cathode, the support is a metal or metal oxide which is later removed, and the spraying occurs at a temperature range from 5° C. to about 50° C. wherein the method only sprays one anode layer, one electrolyte layer and one cathode layer and wherein thickness of each layer deposited by single spraying pass ranges from about 50 nm to about 1 µm.

2. The method claim 1, wherein the electrolyte is a doped ceria.

3. The method claim 1, wherein the electrolyte is a Sc-doped BZCY.

4. The method claim 1, wherein the electrolyte is a dense stabilized zirconia.

5. The method claim 1, wherein the electrolyte is a porous BZCYYb electrolyte.

6. The method of claim 1, wherein the pressure of the spraying ranges from about 0.5 psi to about 100 psi.

7. The method of claim 1, wherein flow rate of the spraying ranges from about 0.1 ml/min to about 20 ml/min.

* * * * *